(12) United States Patent
Seo et al.

(10) Patent No.: US 9,344,954 B2
(45) Date of Patent: May 17, 2016

(54) METHOD FOR DETECTING A SIGNAL FOR DIRECT COMMUNICATION BETWEEN UE'S IN A WIRELESS COMMUNICATION SYSTEM AND APPARATUS FOR SAME

(71) Applicant: LG ELECTRONICS INC., Seoul (KR)

(72) Inventors: Hanbyul Seo, Anyang-si (KR);
Hakseong Kim, Anyang-si (KR);
Yunjung Yi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/359,528

(22) PCT Filed: Dec. 5, 2012

(86) PCT No.: PCT/KR2012/010468
§ 371 (c)(1),
(2) Date: May 20, 2014

(87) PCT Pub. No.: WO2013/085274
PCT Pub. Date: Jun. 13, 2013

(65) Prior Publication Data
US 2015/0050930 A1    Feb. 19, 2015

Related U.S. Application Data

(60) Provisional application No. 61/567,084, filed on Dec. 5, 2011, provisional application No. 61/588,657, filed on Jan. 20, 2012, provisional application No. 61/609,925, filed on Mar. 12, 2012, provisional application No. 61/668,433, filed on Jul. 5, 2012, provisional application No. 61/718,168, filed on Oct. 24, 2012.

(51) Int. Cl.
*H04W 4/00* (2009.01)
*H04W 48/08* (2009.01)
*H04W 76/02* (2009.01)

(52) U.S. Cl.
CPC ............ *H04W 48/08* (2013.01); *H04W 76/023* (2013.01)

(58) Field of Classification Search
CPC ... H04M 3/42; H04L 67/104; H04L 67/1061; H04B 7/005; H04W 48/08; H04W 76/023; H04W 72/02; H04W 68/00; H04W 8/005; H04W 8/26; H04W 92/18; H04W 28/06
USPC ............................................... 370/310.1, 389
See application file for complete search history.

(56) References Cited

U.S. PATENT DOCUMENTS

| | | | |
|---|---|---|---|
| 2002/0082031 A1* | 6/2002 | Stegemann | H04W 56/0035 455/502 |
| 2005/0141565 A1* | 6/2005 | Forest | H04J 3/0652 370/503 |

(Continued)

OTHER PUBLICATIONS

PCT International Application No. PCT/KR2012/010468, Written Opinion of the International Searching Authority dated Mar. 22, 2013, 13 pages.

*Primary Examiner* — Mahendra Patel
(74) *Attorney, Agent, or Firm* — Lee, Hong, Degerman, Kang & Walmey; Jonathan Kang; Michael Monaco

(57) ABSTRACT

The present invention relates to a method for transmitting an identification signal from a first UE to a second UE for direct communication between UE's in a wireless communication system. In particular, the method includes the steps of: transmitting a first identification signal formed by using a part of the information on the first UE to the second UE; and transmitting a second identification signal including the rest of the information on the first UE to the second UE, wherein the transmission duration time of the second identification signal is longer than that of the first identification signal.

12 Claims, 18 Drawing Sheets

(56) References Cited

U.S. PATENT DOCUMENTS

| | | |
|---|---|---|
| 2007/0242665 A1 | 10/2007 | Habetha et al. |
| 2008/0247378 A1* | 10/2008 | Bichot ................ H04B 1/7083 370/350 |
| 2009/0016250 A1* | 1/2009 | Li et al. ...................... 370/310.1 |
| 2009/0017797 A1* | 1/2009 | Li et al. ...................... 455/414.1 |
| 2009/0017851 A1* | 1/2009 | Li et al. ......................... 455/502 |
| 2011/0007717 A1* | 1/2011 | Swarts ................ H04J 11/0069 370/336 |
| 2011/0007718 A1* | 1/2011 | Swarts ................ H04J 11/0069 370/336 |
| 2012/0172041 A1* | 7/2012 | Krishnamurthy ..... H04J 11/005 455/436 |

\* cited by examiner

FIG. 11
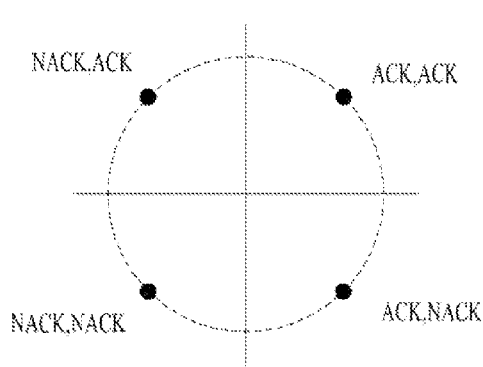
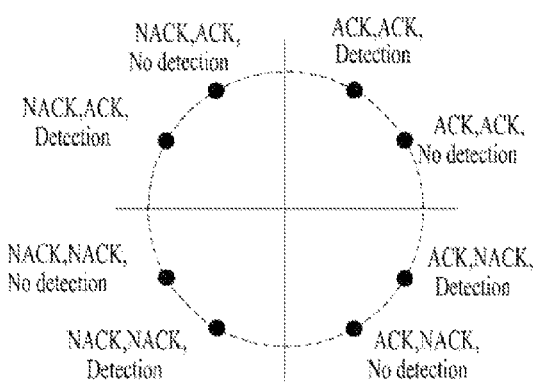
(a) PUCCH CONSTELLATION WITHOUT ID SIGNAL DETECTION STATE
(b) PUCCH CONSTELLATION WITH ID SIGNAL DETECTION STATE

METHOD FOR DETECTING A SIGNAL FOR DIRECT COMMUNICATION BETWEEN UE'S IN A WIRELESS COMMUNICATION SYSTEM AND APPARATUS FOR SAME

CROSS-REFERENCE TO RELATED APPLICATIONS

This application is the National Stage filing under 35 U.S.C. 371 of International Application No. PCT/KR2012/010468, filed on Dec. 5, 2012, which claims the benefit of U.S. Provisional Application Ser. No. 61/567,084, filed on Dec. 5, 2011, 61/588,657, filed on Jan. 20, 2012, 61/609,925, filed on Mar. 12, 2012, 61/668,433, filed on Jul. 5, 2012, and 61/718,168, filed on Oct. 24, 2012, the contents of which are all hereby incorporated by reference herein in their entirety.

TECHNICAL FIELD

The present invention relates to a wireless communication system, and more particularly, a signal detection method for direct communication between user equipments (UEs) in a wireless communication system, and an apparatus for the method.

BACKGROUND ART

A brief description will be given of a $3^{rd}$ generation partnership project long term evolution (3GPP LTE) system as an example of a wireless communication system to which the present invention can be applied.

FIG. 1 illustrates a configuration of an evolved universal mobile telecommunications system (E-UMTS) network as an exemplary wireless communication system. The E-UMTS system is an evolution of the legacy UMTS system and the 3GPP is working on standardization of E-UMTS. E-UMTS is also called an LTE system. For details of the technical specifications of UMTS and E-UMTS, refer to "$3^{rd}$ generation partnership project; technical specification group radio access network" Release 7 and Release 8, respectively.

Referring to FIG. 1, the E-UMTS system includes a user equipment (UE), an evolved Node B (eNode B or eNB), and an access gateway (AG) which is located at an end of an evolved UMTS terrestrial radio access network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.44, 3, 5, 10, 15 and 20 Mhz and provides downlink (DL) or uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, hybrid automatic repeat request (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A core network (CN) may include an AG and a network node for user registration of UEs. The AG manages the mobility of UEs on a tracking area (TA) basis. A TA includes a plurality of cells.

While the development stage of wireless communication technology has reached LTE based on wideband code division multiple access (WCDMA), the demands and expectations of users and service providers are increasing. Considering that other radio access technologies are under development, new technological evolutions are required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

An object of the present invention devised to solve the problem lies in a method and apparatus for detecting a signal for direct communication between user equipments (UEs) in a wireless communication system.

Technical Solution

The object of the present invention can be achieved by providing a method of transmitting an identity (ID) signal from a first user equipment (UE) to a second UE for direct communication between UEs in a wireless communication system, the method including transmitting a first ID signal configured using a portion of information about the first UE to the second UE, and transmitting a second ID signal containing a remaining portion of the information about the first UE to the second UE, wherein transmission holding time of the second ID signal is longer than transmission holding time of the first ID signal.

The first ID signal may be an on-off keying sequence generated using the portion of the information about the first UE. The first ID signal may be an on-off keying sequence generated using information about a point in time for transmission of the second ID signal and the portion of the information about the first UE. In this case, the transmitting of the first ID signal may include transmitting a signal at predetermined transmission power in a transmission resource corresponding to a value that is not 0 and transmitting a null signal in a transmission resource corresponding to a value 0 in the on-off keying sequence.

In another aspect of the present invention, provided herein is a method of receiving an identity (ID) signal from a first user equipment (UE) by a second UE for direct communication between UEs in a wireless communication system, the method including receiving a first ID signal configured using a portion of information about the first UE to the second UE, and receiving a second ID signal containing a remaining portion of the information about the first UE from the first UE, wherein reception holding time of the second ID signal is longer than reception holding time of the first ID signal.

The first ID signal may be an on-off keying sequence generated using the portion of the information about the first UE. The first ID signal may be an on-off keying sequence generated using information about a point in time for transmission of the second ID signal and the portion of the information about the first UE. In this case, the receiving of the first ID signal may include determining that the first ID signal is detected when a signal of predetermined power is received in a transmission resource corresponding to a value that is not 0 in the on-off keying sequence.

The portion of the information about the first UE may be at least one of a unique number of the first UE, the second ID signal, and a type of a communication service to be performed by the first UE. The portion of the information about the first UE may be a portion of a unique number of the first UE, and a remaining portion of the information about the first UE may be a remaining portion of the unique number.

Advantageous Effects

According to embodiments of the present invention, an identify (ID) signal, etc. for direct communication between user equipments (UEs) in a wireless communication system can be effectively detected.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

FIG. 11 illustrates an example in which a UL ACK/NACK signal includes information about ID signal detection according to a first embodiment of the present invention.

BEST MODE

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
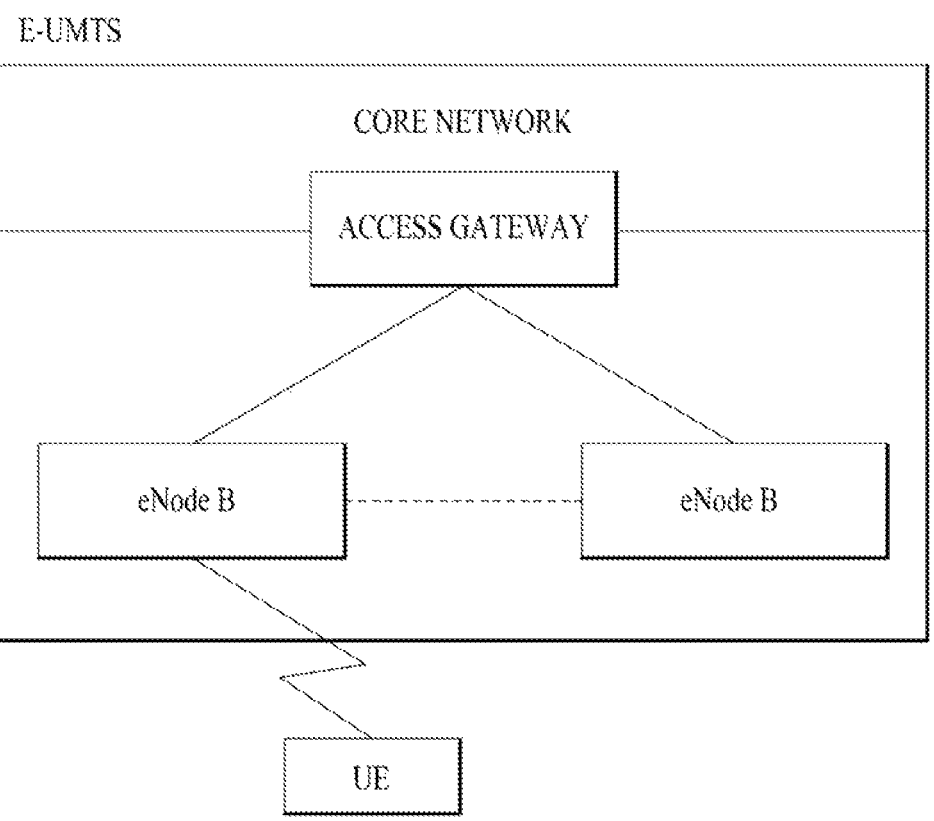
FIG. 1 illustrates a configuration of an evolved universal mobile telecommunications system (E-UMTS) network as an exemplary wireless communication system.
Figure 2:
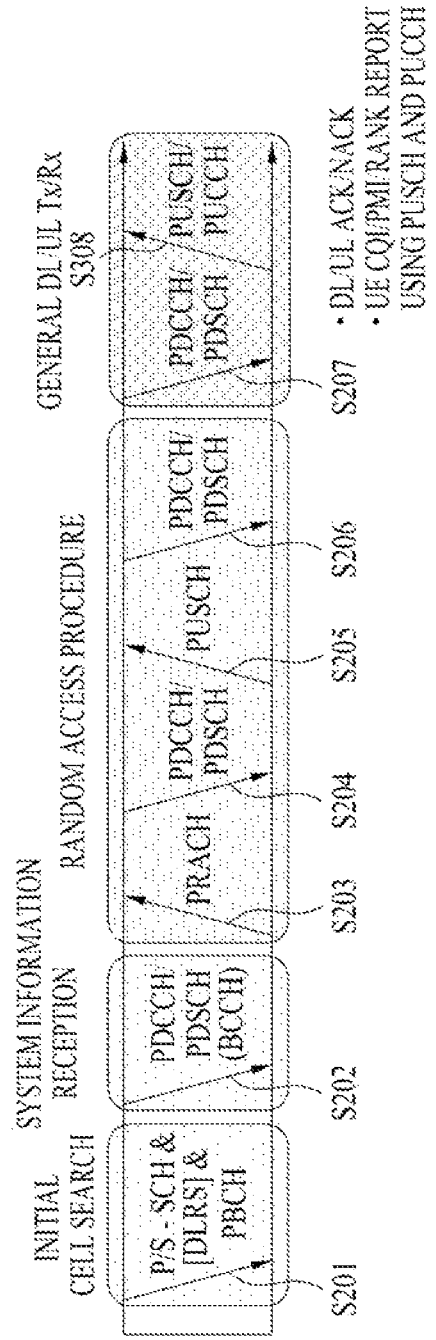
FIG. 2 is a diagram for explanation of physical channels and a general method for transmitting signals on the physical channels in a $3^{rd}$ generation partnership project (3GPP) system.

FIG. 2 is a diagram for explanation of physical channels and a general method for transmitting signals on the physical channels in the 3GPP system.

A UE performs an initial cell search operation such as synchronization with an eNB when power is turned on or the UE enters a new cell (S201). To this end, the UE may receive a primary synchronization channel (P-SCH) and a secondary synchronization channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a downlink reference signal (DL RS) so as to confirm a downlink channel state in the initial cell search step.

The UE which completes the initial cell search may receive a physical downlink control channel (PDCCH) and a physical downlink shared channel (PDSCH) according to information included in the PDCCH so as to acquire more detailed system information (S202).

Meanwhile, if the eNB is initially accessed or radio resources for signal transmission are not present, the UE may perform a random access procedure (RACH) (step S203 to S206) with respect to the eNB. To this end, the UE may transmit a specific sequence through a Physical Random Access Channel (PRACH) as a preamble (S203 and S205), and receive a response message of the preamble through the PDCCH and the PDSCH corresponding thereto (S204 and S206). In the case of contention-based RACH, a contention resolution procedure may be further performed.

The UE which performs the above procedures may perform PDCCH/PDSCH reception (S207) and Physical Uplink Shared Channel PUSCH)/Physical Uplink Control Channel (PUCCH) transmission (S208) as a general uplink/downlink signal transmission procedure. In particular, the UE receives downlink control information (DCI) via a PDCCH. The DCI includes control information such as resource allocation information of the UE and the format thereof is changed according to use purpose.

The control information transmitted from the UE to the eNB in uplink or transmitted from the eNB to the UE in downlink includes a downlink/uplink ACK/NACK signal, a channel quality indicator (CQI), a precoding matrix index (PMI), a Rank Indicator (RI), and the like. In the case of the 3GPP LTE system, the UE may transmit the control information such as CQI/PMI/RI through the PUSCH and/or the PUCCH.

Figure 3:
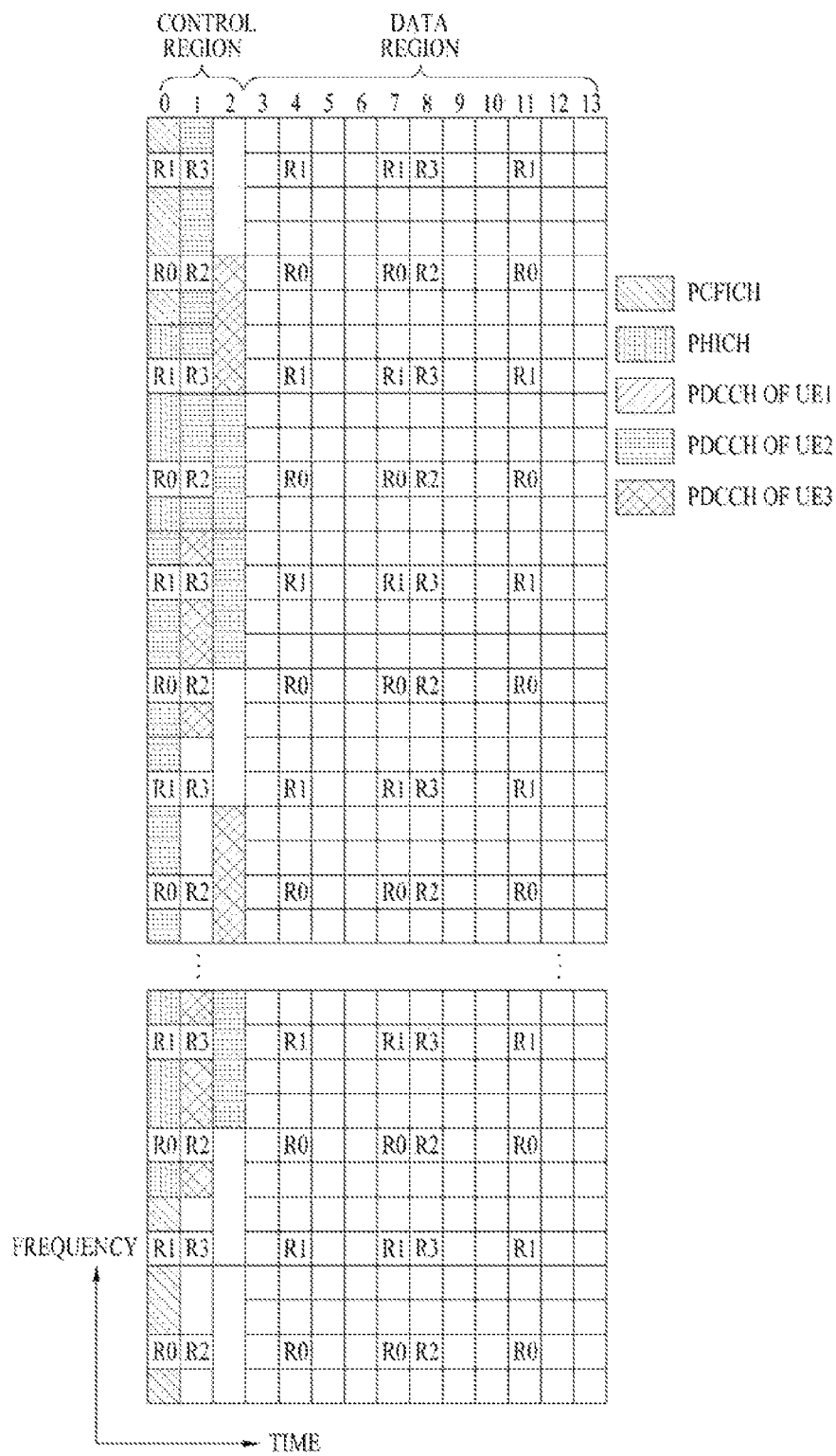
FIG. 3 is a diagram illustrating exemplary control channels included in a control region of a subframe in a downlink (DL) radio frame.

FIG. 3 is a diagram illustrating exemplary control channels included in a control region of a subframe in a DL radio frame.

Referring to FIG. 3, a subframe includes 14 OFDM symbols. The first one to three OFDM symbols of a subframe are used for a control region and the other 13 to 11 OFDM symbols are used for a data region according to a subframe configuration. In FIG. 3, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a physical control format indicator channel (PCFICH), a physical hybrid-ARQ indicator channel (PHICH), a physical downlink control channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 resource element groups (REGs), each REG being distributed to the control region based on a cell identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in quadrature phase shift keying (QPSK).

The PHICH is a physical HARQ indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in binary phase shift keying (BPSK). The modulated ACK/NACK is spread with a spreading factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Here, n is 1 or a larger integer indicated by the PCFICH. The PDCCH occupies one or more control channel elements (CCEs). The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the cyclic redundancy check (CRC) of a specific PDCCH is masked by radio network temporary identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 4:
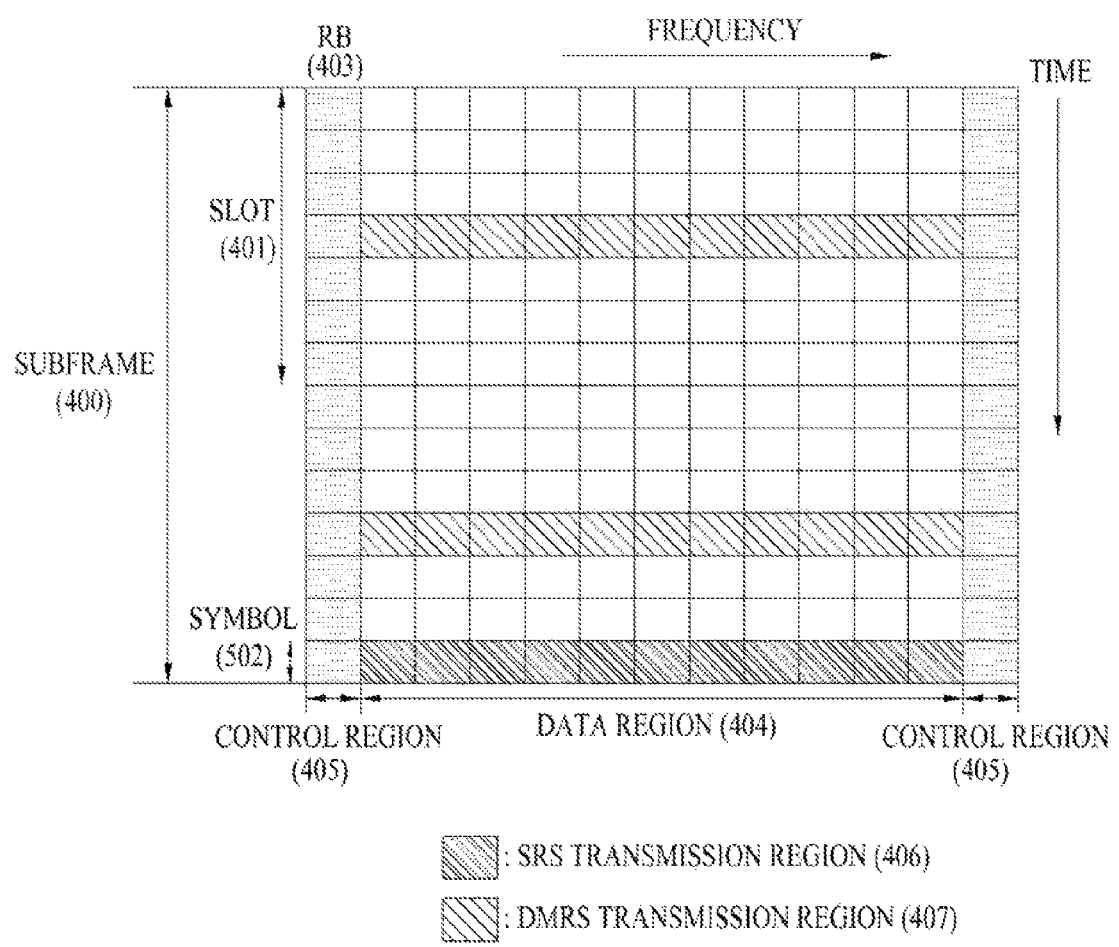
FIG. 4 is a diagram illustrating a structure of an uplink (UL) subframe used in a long term evolution (LTE) system.

FIG. 4 is a diagram illustrating a structure of a UL subframe used in an LTE system.

Referring to FIG. 4, a subframe 400 with 1 ms as a basic unit of UL transmission is composed of two 0.5 ms slots 401. In the case of normal cyclic prefix (CP), each slot includes seven symbols and each symbol corresponds to one SC-FDMA symbol. A resource block 403 is a resource allocation unit that corresponds to 12 subcarriers in the frequency domain and corresponds to one slot in the time domain. The structure of the UL subframe of LTE is largely divided into a data region 404 and a control region 505. Here, the data region 404 refers to a type of communication resource used to transmit data such as voice, packets, etc. transmitted to each UE and corresponds to remaining resources except for a control region in a subframe. The control region refers to a type of communication resource used to transmit DL channel quality report, reception ACK/NACK to DL signals, UL scheduling request, etc. from each UE.

As in the example illustrated in FIG. 4, a sounding reference signal (SRS) transmission region 406 in one subframe is a section in which a last SC-FDMA symbol is present on the time axis in one subframe and is transmitted through a data transmission band on the frequency axis. SRSs of various UEs, transmitted to the last SC-FDMA of the same subframe, can be distinguished according to a frequency location.

Furthermore, a demodulation-reference signal (DMRS) transmission region 407 in one subframe is a section in which an intermediate SC-FDMA symbol of each slot is present on the time axis and is also transmitted through a data transmission band on the frequency axis. For example, in a subframe to which normal CP is applied, a DMRS is transmitted in a $4^{th}$ SC-FDMA symbol and a $11^{th}$ SC-FDMA symbol.

A DMRS can be combined with transmission of a PUSCH or a PUCCH. An SRS is a reference signal transmitted to an eNB by a UE for UL scheduling. The eNB estimates an UL channel through the received SRS and uses the estimated UL channel for UL scheduling. The SRS is not combined with transmission of a PUSCH or a PUCCH. For the DMRS and the SRS, the same type of basic sequence can be used. Precoding applied to the DMRS in UL multiple-antenna transmission may be the same as precoding applied to a PUSCH.

The present invention proposes a UE to UE communication scheme in which a UE performs direct communication without using an eNB.

Figure 5:
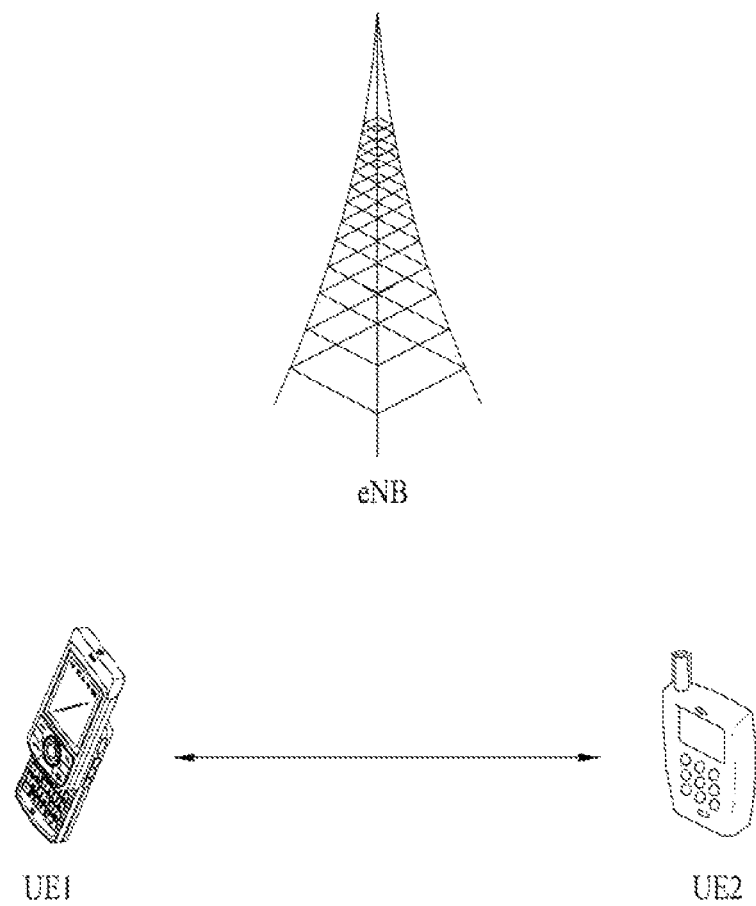
FIG. 5 is a diagram illustrating concept of a user equipment (UE) to UE communication scheme.

FIG. 5 is a diagram illustrating concept of a UE to UE communication scheme.

Referring to FIG. 5, the UE to UE communication scheme, that is, a direct communication scheme between UEs is advantageous in that latency is reduced to reduce radio resource consumption compared with a conventional eNB-centered communication scheme in which one UE transmits a signal to an eNB and then the eNB re-transmits the signal to another UE.

Although FIG. 5 illustrates the case in which two UEs are controlled by a single eNB, the present invention is not limited thereto and it can be possible that two UEs that perform a direct communication scheme between UEs are controlled by two different eNBs. In particular, when two UEs are controlled by two different eNBs, direction communication between UEs can be performed based on information exchange between eNBs, which can be embodied using a method that will be described below.

First Embodiment

To perform the direction communication between UEs, a UE at one side needs to recognize whether a UE at an opposite side is present, which can be achieved through a procedure in which a UE that wants direct communication between UEs transmits an ID signal indicating the existence of the UE and the opposite side UE detects the ID signal. Here, in order to accurately recognize the opposite side UE and to smoothly initiate a service, the ID signal may include signals indicating various attributes of a transmission UE, for example, a unique number given to a corresponding UE, a type of a communication service to be performed by the corresponding UE, etc.

In general, transmission power of a UE is at a low level compared with a signal of an eNB, and thus, signals need to be transmitted over relatively long time to increase a total amount of energy used for the corresponding signal in order to transmit the signal containing the above various pieces of information at low power, which is effective to widen coverage of the ID signal. However, when the ID signal is transmitted over long time, a UE that detects the signal needs to attempt to detect for relatively long time, thereby increasing battery consumption, and when restrictions are generated on signal transmission to an eNB or another UE during a detection operation, problems arise in that time taken for the transmission is increased for the restrictions.

To address the problems, the present invention proposes an operation in which a UE divides an ID signal and transmits the divided ID signal through two separate steps. More preferably, periods of time when two divided ID signals are maintained to be transmitted are configured to be different from each other. Hereinafter, an operating principle for the case in which a UE 1 transmits two divided ID signals, that is, a short ID signal and a long ID signal are transmitted and a UE 2 detects the two ID signals will be described.

First, the UE 2 attempts to detect the short ID signal of the UE 1 to which the UE 2 wants to be connected. Here, since the short ID signal is maintained to be transmitted for a short period of time, the short ID signal may not include the aforementioned information, that is, a unique number given to a corresponding UE, a type of communication service to be performed by the corresponding UE, etc. In this case, the UE 2 that detects the short ID signal of the UE 1 cannot acquire all pieces of information of the UE 1, which can be obtained via ID signal detection, and can acquire the remaining information of the UE 1 via detection of the long ID signal. This means that a plurality of UEs can share the same short ID signal and transmit the ID signal together.

As an example of a method of forming the short ID signal, an on-off keying sequence can be formed using an output value obtained by applying a hashing function to information such as a unique number of long ID signal of a UE, and/or a type of communication service to be performed by the UE.

In detail, assuming that the short ID signal is transmitted by $N_{short}$ resource elements (REs) and the unique number of the UE is used as an input of K of total hashing functions $f_0, \ldots, f_{(K-1)}$, the short ID signal of the corresponding UE may be formed to be transmitted to a corresponding RE corresponding $f_k$(UE ID) and not to be transmitted to an RE that does not correspond to $f_k$(UE ID), that is, in the form for holding zero power.

Figure 6:
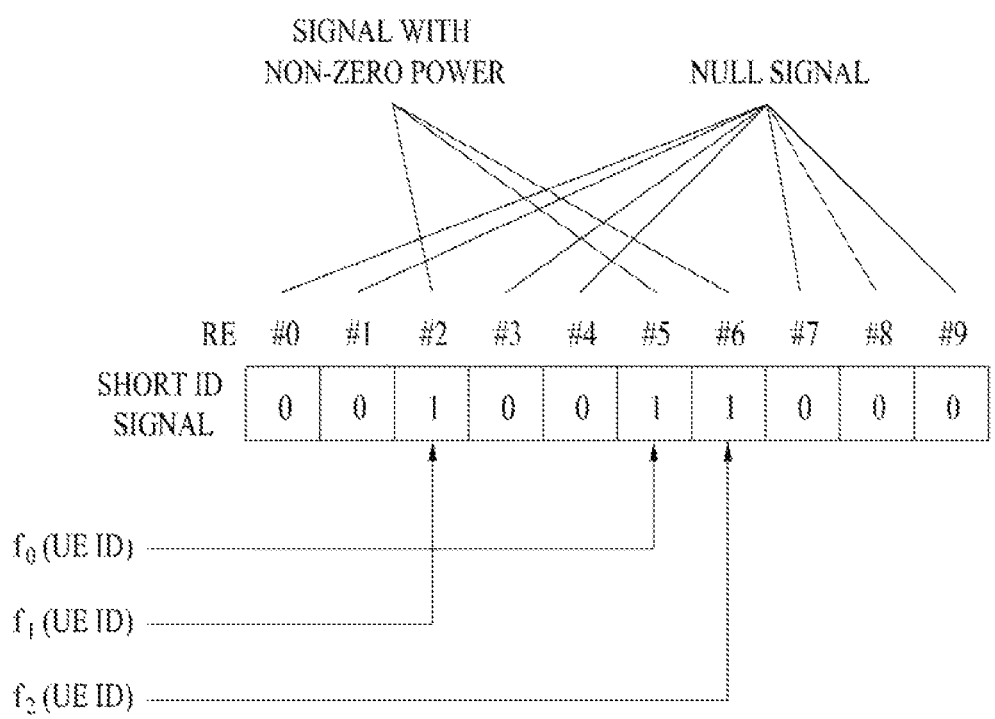
FIG. 6 is a diagram illustrating an example of generation of a short ID signal according to a first embodiment of the present invention.

FIG. 6 is a diagram illustrating an example of generation of a short ID signal according to a first embodiment of the present invention. In particular, FIG. 6 illustrates the case with $N_{short}$=10 and K=3 and assumes that $f_0$(UE ID)=5, $f_1$(UE ID)=2, and $f_2$(UE ID)=6.

Referring to FIG. 6, short ID signals are generated as [0010011000], and a corresponding UE transmits a short ID signal of the UE via on-off keying for transmitting a predetermined signal in RE #2, RE #5, and RE #6 configured to 1 and transmitting a null signal in the remaining REs configured to 0. Thus, when the UE 1 detects non-zero power from all REs for the short ID signal, the UE 2 determines that the short ID signal of the UE 1 is detected.

When different UEs simultaneously transmit short IDs of the UEs, signals from which non-zero power is detected can be detected in the different REs, or overlapped signals can be transmitted in some of REs in which the UE 1 transmits the signals. Accordingly, even if a specific UE is not present, a short ID signal pattern of the corresponding UE can be formed by short ID signals of other UEs. For example, in FIG. 6, when non-zero power is detected from RE #2, RE #5, and RE #6 according to signals of other UEs, even if the UE 1 is not present, the short ID signal of the UE 1 is detected.

In order to prevent the continued problems, each UE can change a short ID transmitted from the UE according to time. That is, when the short ID signal is formed, a method in which time information such as a frame index as well as a UE ID can be added to the short ID signal may be consider.

The UE 2 that detects the short ID signal of the UE 1 recognizes possibility that the UE 1 is present within a communicable range and attempts to detect a long ID signal of the UE 1. As described above, since the short ID signal is maintained to be transmitted at a short period of time, the UE 2 can recognize that the UE 1 is not present within the communicable range via detection for the short period of time, thereby preventing various problems in detection of the long ID signal.

Figure 7:
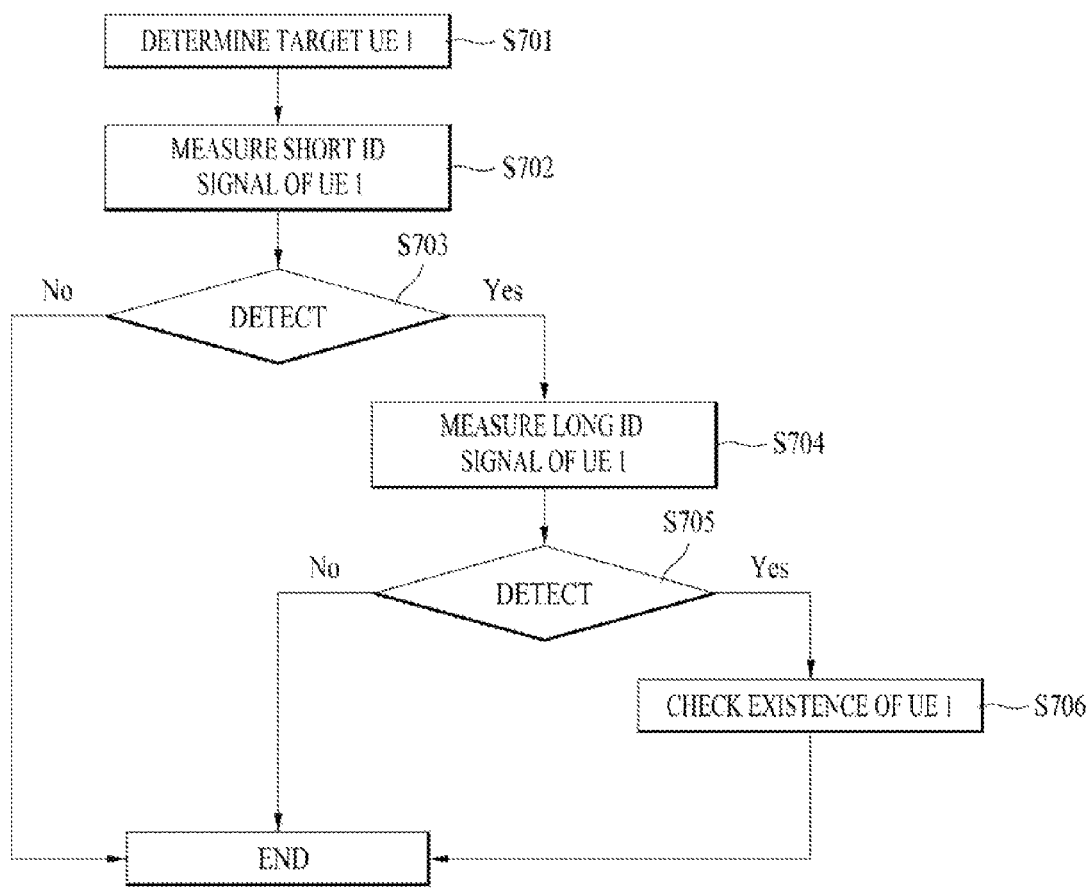
FIG. 7 is a flowchart illustrating an example of detection of an ID signal by a UE according to the first embodiment of the present invention.

FIG. 7 is a flowchart illustrating an example of detection of an ID signal by a UE according to the first embodiment of the present invention. That is, FIG. 7 illustrates an example of an operation performed by the UE 2 according to the first embodiment of the present invention.

Referring to FIG. 7, a target UE is determined in S701. That is, in FIG. 7, the target UE is determined as the UE 1. Then the UE 2 measures a short ID signal in S702 and determines whether the short ID signal of the UE 1 is detected in S703.

When the short ID signal of the UE 1 is not detected, a detection procedure for direction communication between UEs is completed. However, when the short ID signal of the UE 1 is detected, a long ID signal is measured in S704, and whether a long ID signal of the UE 1 is detected is determined in 705.

Similarly, when the long ID signal of the UE 1 is not detected, the detection procedure for direct communication between UEs is completed, and when the long ID signal of the UE 1 is detected, existence of the UE 1 is checked in S706 and subsequent procedures for direct communication between the UE 1 and a UE are performed.

A long ID signal can be smoothly detected by associating a sequence, a transmission location, etc. of the aforementioned short ID signal with a location of the long ID signal. For example, a long ID signal may be predetermined to be repeatedly transmitted M times at a frequency corresponding to P at a point in time away from a point in time when a short ID signal is transmitted by as much as time T. In this case, the UE 2 that detects the short ID signal of the UE 1 can recognize where the long ID signal of the UE 1 is transmitted and thus can effectively detect the long ID signal. Here, parameters T, P, and M may be predetermined or may be contained in a signal broadcast by an eNB. Alternatively, the parameters may be contained in a short ID signal. For example, an input parameter (i.e., an input of a hashing function in the example of FIG. 6) constituting a short ID signal may include values T, P, and M, and upon detecting a short ID signal with a specific pattern, the UE 2 may operate to acquire a parameter associated with the short ID signal.

Figure 8:
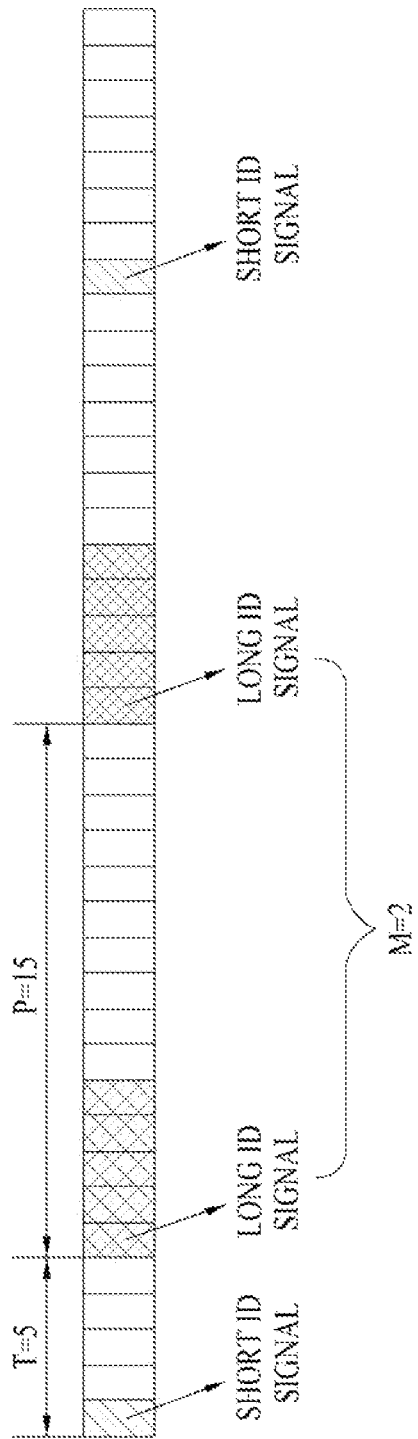
FIG. 8 illustrates an example in which a short ID signal and a long ID signal are transmitted according to a first embodiment of the present invention.

FIG. 8 illustrates an example in which a short ID signal and a long ID signal are transmitted according to the first embodiment of the present invention. In particular, FIG. 8 assumes that T=5, P=15, and M=2 and that the long ID signal is transmitted for 5 time units.

In addition, the UE 1 can add information about a point in time when data of the UE 1 is transmitted to locations of the aforementioned long ID signal and/or short ID signal and then the UE 2 that detects the long ID signal and/or the short ID signal can immediately receive the data of the UE 1.

Thus far, the case in which an ID signal is divided into a short ID signal and a long ID signal and is transmitted through two separate steps has been described. However, the operation principle of embodiments of the present invention is not limited thereto. Thus, the embodiments of the present invention can also be applied to a case in which the ID signal is transmitted through two or more steps. That is, when the UE 1 transmits an ID signal of the UE 1 through two or more steps and the UE 2 sequentially attempts to detect ID signals of the respective steps to detect a final ID signal, the UE 2 can recognize whether the UE 1 is present and perform an appropriate operation (e.g., an operation of reporting detection success of the UE 1 to an eNB or transmitting a signal indicating that the UE 2 directly approaches the UE 1) according to the recognition result.

As an example of transmitting and detecting an ID signal of a UE through multi-steps, the UE 1 may divide one long ID signal into two or more portions and transmit the portions at constant intervals.

Figure 9:
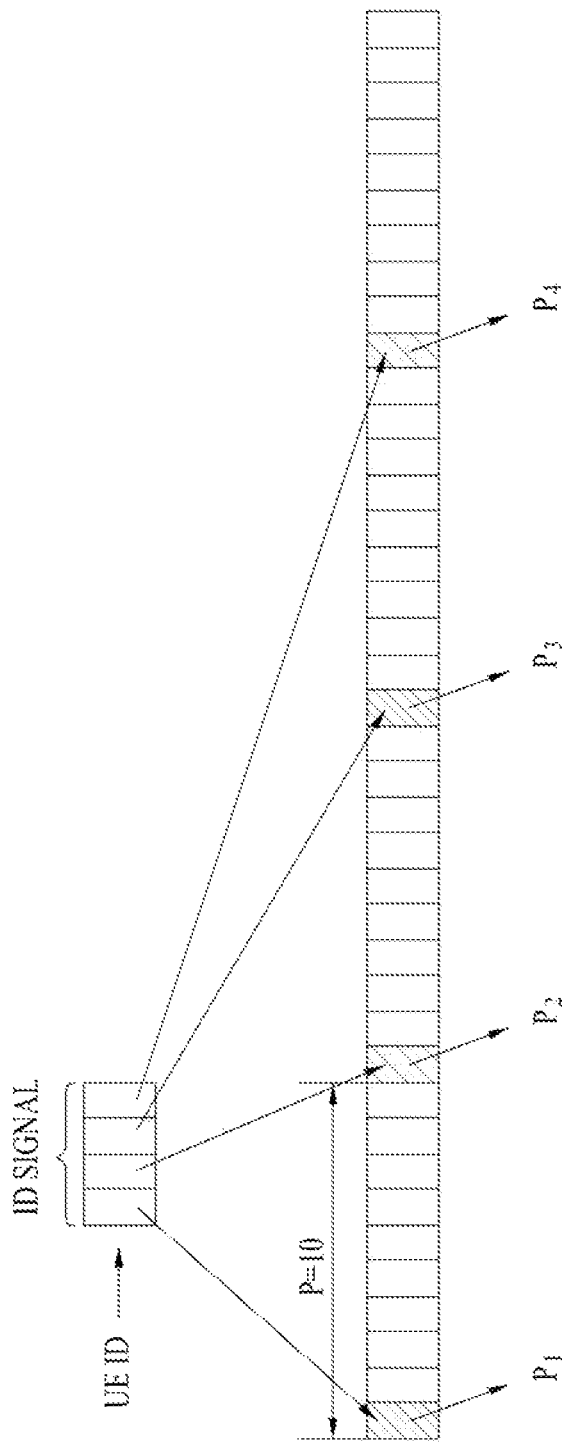
FIG. 9 illustrates an example in which an ID signal is transmitted through multi-steps according to the first embodiment of the present invention.

FIG. 9 illustrates an example in which an ID signal is transmitted through multi-steps according to the first embodiment of the present invention.

Referring to FIG. 9, the UE 1 forms an ID signal of the UE 1, divides the ID signal into N portions $P_1, P_2, \ldots, P_N$, and then transmits the N portions $P_1, P_2, \ldots, P_N$ at constant intervals. In FIG. 9, for convenience of description, it is assumed that N is 4.

When $P_N$ is finally detected by repeating an operation in which the UE 2 attempts to detect $P_1$ and succeed in detection of $P_1$ and then attempts to detect $P_2$ after a predetermined period of time, the UE 2 can recognize whether the UE 1 is present. When the UE 2 cannot detect a specific portion, the UE 2 determines that the UE 1 does not approach and does not detect the next remaining portions, thereby preventing the aforementioned side effects such as increase in battery consumption.

Figure 10:
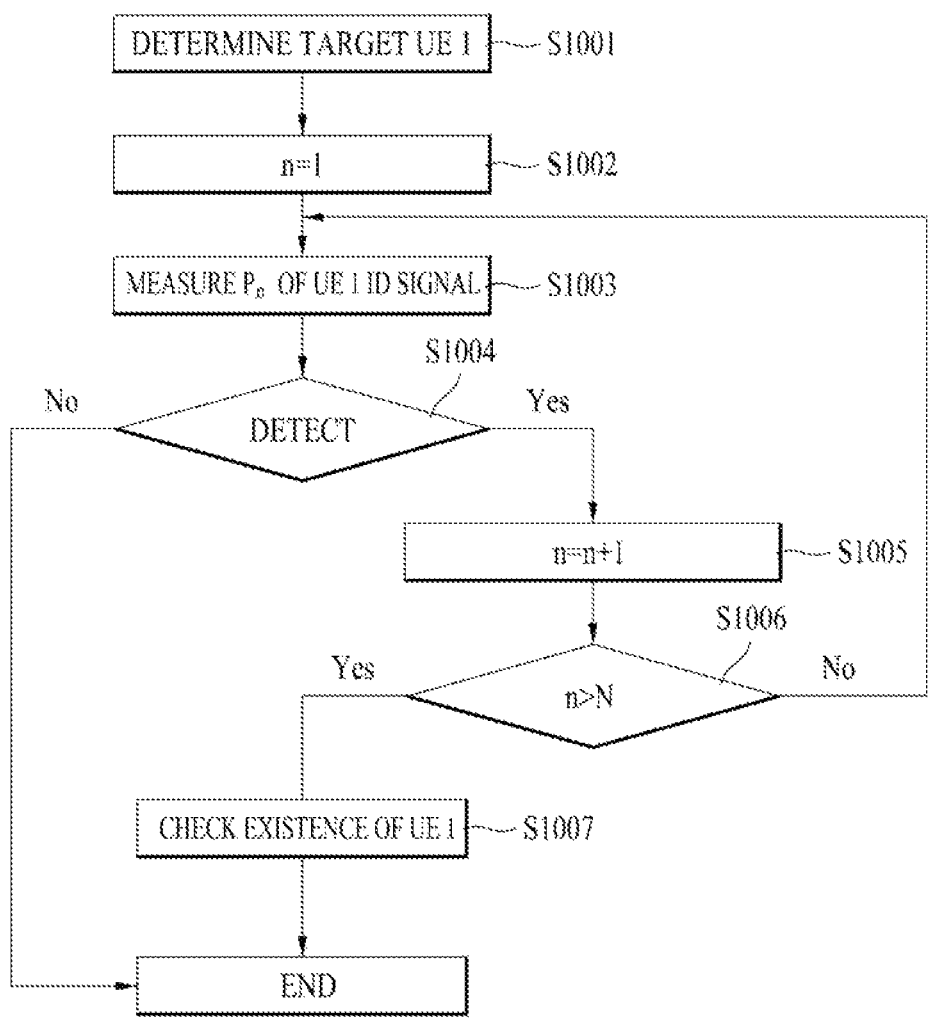
FIG. 10 is a flowchart illustrating another example of detection of an ID signal by a UE according to the first embodiment of the present invention.

FIG. 10 is a flowchart illustrating another example of detection of an ID signal by a UE according to the first embodiment of the present invention. In particular, FIG. 10 assumes that an ID signal is transmitted through multi-steps.

Referring to FIG. 10, in S1001, a target UE is determined as the UE 1, and in S1002, a counter n is set to 1. Then the UE 2 measures $P_n$ that is a portion of the ID signal in S1003. In addition, the UE 2 determines whether $P_1$ that is a portion of the ID signal of the UE 1 is detected, in S1004.

When $P_1$ is not detected, a detection procedure for direction communication between UEs is completed. However, when $P_1$ is detected, the counter n is increased by 1 in S1005, and whether n is greater than the number of portions formed by dividing the ID signal of the UE 1, that is, N, in S1006.

Then when n is not greater than N, the method returns to S1003, $P_2$ that is a portion of the ID signal of the UE 1 is detected and continuously this type of operation is repeated until the entire ID signal is detected. When n is greater than N, this means that the entire ID signal of the UE 1 is detected. Thus, in S1007, whether the UE 1 is present is checked and subsequent procedures for direct communication between the UE 1 and a UE are performed.

In the aforementioned operation, while the UE 2 detects the ID signal of the UE 1, other operations are limited. For example, when the UE 2 detects the signal of the UE 1 from UL resources (that is, a UL band in an FDD system and a UL subframe in a TDD system), it is very difficult to simultaneously perform this detection operation and a transmission operation in the corresponding UL resource. This is because a signal transmitted by the UE 2 may act as strong interference to a signal detected by the UE 2. Thus, the UE 2 may not transmit a signal of the UE 2 while detecting a signal of the UE 1. If the UE 2 uses DL resource, while the UE 2 detects an ID of another UE, there may also be a limit in receiving a DL signal of an eNB.

To address this problem, the UE 2 may notify other UEs or an eNB of information about a point in time when the UE 2 attempts to detect the ID signal of the UE 1. In particular, when the UE 2 notifies the eNB of the information, the eNB can adjust scheduling of the UE 2 based on the information. For example, when DL data is transmitted, the eNB may also schedule the UE 2 to transmit an ACK/NACK signal to the DL data at a point in time except for ID signal detection time or when UL data is transmitted, the eNB may also schedule the UE 2 to transmit uplink data at a point in time except for ID signal detection time.

In addition, the UE 2 may periodically or aperiodically transmit information about a point in time when the signal of the UE 1 is detected to the eNB (or other UEs). The information may include a period with which the UE 2 detects a signal, time offset, detection holding duration, etc. In particular, when the information is periodically reported to the eNB, the eNB may allocate resources to be used for the report to the UE 2 through a higher layer signal such as an RRC.

For reporting whether the ID signal of the UE 1 is detected or a point in time when the signal is detected to the eNB by the UE 2, a method using a response to UL or DL scheduling of the eNB can be considered. For example, when the UE 2 receives a UL or DL scheduling message from the eNB at a point in time t and transmits UL data or UL ACK/NACK in response to the message at a point in time t+s, the UL ACK/NACK signal may include information regarding whether the signal of the UE is detected.

For example, in a 3GPP LTE system, when the UE 2 receives a scheduling message of DL data from the eNB through a PDCCH at a point in time t, information regarding whether reception of the corresponding data is successful may be transmitted through a PUCCH determined by the PDCCH at a point in time t+s. State information may be further added to the PUCCH such that the PUCCH may include information about whether UE signal detection will be performed at a point in time t+s or information about whether the UE signal is detected.

FIG. 11 illustrates an example in which a UL ACK/NACK signal includes information about ID signal detection according to the first embodiment of the present invention. In particular, although FIG. 11 assumes that ID signal detection is performed by triggering of an eNB and a result of the ID signal detection is reported, a case in which information about a point in time for ID signal detection is reported is not excluded.

As illustrated in FIG. 11(a), conventionally, ACK/NACK information to DL data having 2 codewords is expressed in two bits and then is transmitted using QPSK constellation. However, as illustrated in FIG. 11(b), one bit indicating whether the ID signal of the UE 1 is detected is added to ACK/NACK information and a PUCCH is transmitted using 8 of total PSK constellation.

When information about whether the ID signal is detected is contained in the PUCCH information, an interval between used constellation points may be set to be irregular. For example, in FIG. 11(b), an interval between two constellation points having the same PDSCH decoding result can be shorter than an interval with the other constellation points. This is because, as the interval between the two constellation points having the same PDSCH decoding result is increased, the PDSCH decoding result becomes similar to those of the other constellation points and error possibility for reporting PDSCH decoding to the eNB increases, thereby causing much side effects such as unnecessary increase of PDSCH retransmission. When the information about whether the ID signal is detected is contained in the PUCCH signal, overall error possibility may increase, and thus, the UE 2 can operate with high transmission power compared with a case in which the information is not contained in the PUCCH signal.

When the UE 2 receives a scheduling message of UL data through a PDCCH at a point in time t, information about whether the ID signal is detected may be added to a location of a transmission PUSCH and transmitted at a point in time t+s, or like in the case of DL scheduling, the information about whether the ID signal is detected may be reported to the eNB through PUCCH resource associated with the corresponding PDCCH.

Through the aforementioned method, the eNB can recognize that the UE 2 attempts to detect the ID signal of the UE 1 or detects the ID signal of the UE 1 at a point in time t+s. In addition, the corresponding eNB can pre-know information about a period with which the ID signal of the UE 1 is transmitted and thus can adjust scheduling such that the UE 2 may not transmit a UL signal at a point in time when the ID signal of the UE 1 will be transmitted.

Figure 12:
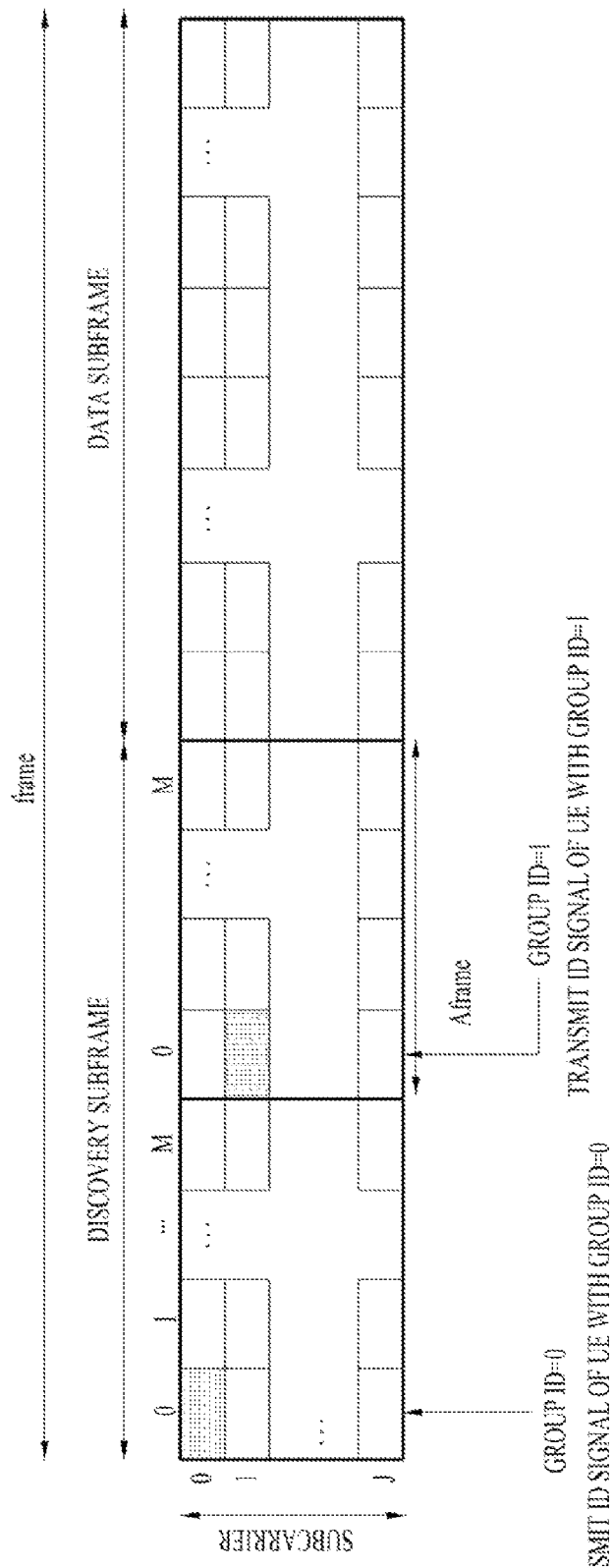
FIG. 12 is a diagram illustrating another example of transmitting a short ID signal for direct communication between UEs according to a first embodiment of the present invention.

FIG. 12 is a diagram illustrating another example of transmitting a short ID signal for direct communication between UEs according to the first embodiment of the present invention. In particular, FIG. 12 proposes a hierarchical UE detection scheme using UE grouping and single tone transmission. First, it is assumed that the UE can use (J+1) subcarriers and there are (M+1) tones for transmission of an ID signal by a UE, that is, for indicating existence of a UE in one Aframe.

As described above, it is assumed that a UE ID includes a unique number or long ID signal of a UE, and/or a type of a communication service to be performed by the UE and that a hashing function generates a UE ID with M digits of base-J. That is, the hash value is assumed to be $(h_0, h_1, \ldots h_M)$. It is assumed that one frame is divided into a discovery subframe and a data subframe, that one discovery subframe consists of a plurality of Aframes, and that each Aframe consists of M tones.

UE grouping is performed based on the hash value $h_0$ or $h_M$ and UEs belonging to the same group transmit ID signals in the same Aframe together. Here, a first tone of the Aframe indicates a group ID $h_0$ or $h_M$ as illustrated in FIG. 12. As a result, it is sufficient that the UE 2 receives only Aframe of an ID of a group to which a UE to be detected by the UE 2 belongs, that is, the UE 1. In a first Aframe, a group ID can be increased by one at a time in order to adjust a plurality of groups that transmits ID signals. In addition, in order to detect a group that currently transmits an ID signal, a UE needs to receive at least one Aframe prior to transmission of an ID signal of the UE.

In the on-off keying-based discovery signal described with reference to FIGS. 6 and 12, a space occupied by a basic unit of on-off keying in the frequency domain may be one subcarrier for multiplexing more discovery signals if possible or a subcarrier group consisting of a plurality of subcarriers for reducing influence such as frequency selective interference, etc. Here, subcarriers consisting one subcarrier group may be subcarriers that are spaced apart at a predetermined level or more for frequency diversity.

Figure 13:
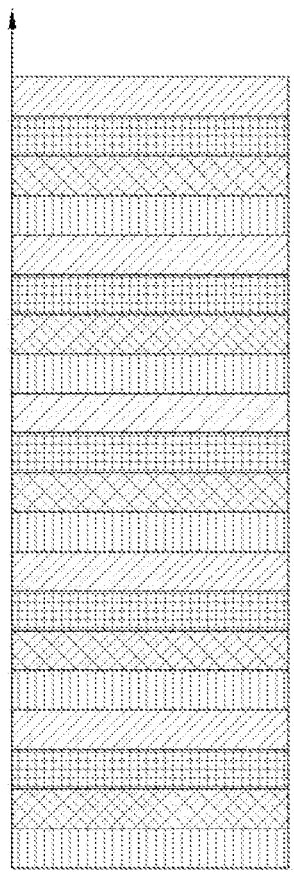
FIG. 13 illustrates an example in which a basic unit of on-off keying is set to a subcarrier group according to the first embodiment of the present invention.

FIG. 13 illustrates an example in which a basic unit of on-off keying is set to a subcarrier group according to the first embodiment of the present invention.

Referring to FIG. 13, subcarriers constituting one subcarrier group may be subcarriers that are spaced apart from each other at constant intervals. In this case, a discovery signal in the time domain is formed in such a way that predetermined signal blocks are repeated with their phases changed.

For example, when one signal block is expressed as $[a_0, a_1, \ldots, a_{N-1}]$, a final discovery on an OFDM (or SC-FDMA) symbol for transmitting a corresponding discovery signal is transmitted in the form of $b_0*a_0, b_0*a_1, \ldots, b_0*a_{N-1}, b_1*a_0, b_1*a_1, \ldots, b_1*a_{N-1}, \ldots, b_{M-1}*a_0, b_{M-1}*a_1, \ldots, b_{M-1}*a_{N-1}$. Here, $b_n$ is a parameter for adjusting a phase of an $n^{th}$ signal block of the repeated signal blocks.

Thus, without configuration of a discovery signal in the frequency domain via fast Fourier transform (FFT), a direct transmission signal can be configured in the time domain, thereby simplifying a discovery signal generating procedure of the UE. When the signal block is expressed as described above, a sequence $[a_0, a_1, \ldots, a_{N-1}]$ in the signal block and/or a sequence $[b_0, b_1, \ldots, b_{M-1}]$ for adjusting a phase of the signal block may be determined by a hashing function or by signaling, a cell ID, etc. of the eNB.

In order to maintain single carrier (SC)-FDMA as a basic structure of a UL transmission signal of a legacy LTE system, adjacent subcarriers may be grouped to form one subcarrier group. In particular, when adjacent subcarriers form one subcarrier group, a signal transmitted from the one subcarrier group may reuse a DMRS or SRS as a UL transmission signal of the legacy LTE and attributes of a random access preamble, that is, attributes of resource mapping, generation of scrambling sequence, etc.

Figure 14:
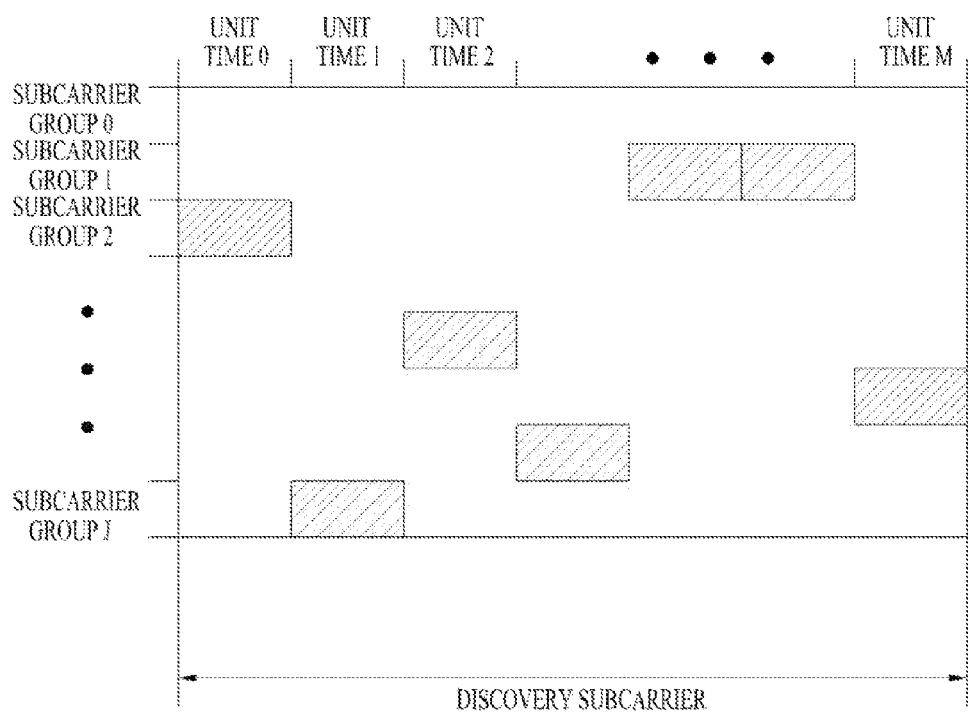
FIG. 14 is a diagram illustrating an example in which a hash value derived from an UE ID, etc. is transmitted in the form of subcarrier group using on-off keying according to the first embodiment of the present invention.

FIG. 14 is a diagram illustrating an example in which a hash value derived from an UE ID, etc. is transmitted in the form of subcarrier group using on-off keying according to the first embodiment of the present invention.

Referring to FIG. 14, when a hash value $h_n$ is transmitted, predetermined signals may be transmitted to a subcarrier group $h_n$ at predetermined power at an $n^{th}$ time of a corresponding subframe, for example, at symbol time in which $n^{th}$ transmission is possible in a discovery signal transmission subframe. That is, FIG. 14 assumes that $h_0=2$ and $h_1=J$.

In the example of FIG. 14, assuming that a signal transmitted in a subcarrier group has the same form as an SRS, an operation of a UE of FIG. 14 may be performed in such a way that an SRS is transmitted to some resource blocks every symbol and a location of a resource block of an SRS transmitted in each symbol is varied according to a hash value. When the number of elements of the hash value, M is very large and thus the elements cannot be transmitted in one subframe, some of the elements may be transmitted in one subframe and the other elements may be transmitted in another discovery subframe.

In addition, a signal transmitted in each symbol, for example, various parameters of an SRS, in more detail, an initial value used to generate an SRS sequence may also be configured to be derived from an ID, etc. of a UE so as to distinguish ID signals of UEs from each other through parameters of resource blocks as well as locations of resource blocks of the SRS. This is advantageous in that ID signals of more UEs can be simultaneously multiplexed. In this case, a parameter of an SRS transmitted in each symbol may be configured to be varied by the hash value according to a predetermined rule and thus a location of a resource block of an SRS in which an ID signal of a specific UE is to be used, a sequence initial value, etc. may be combined when ID signal information of each UE is detected. That is, this may means that a parameter for an initial value of an SRS sequence is considered as another domain for determination of a resource except for the time domain and the frequency domain, a resource having three dimensions such as parameters for time, frequency, and an initial value is divided into a plurality of resource regions, and then on-off keying is performed on each resource region according to a hash value from an UE ID.

A UE that receives a discovery signal via the aforementioned method may inversely apply the hashing function to the on-off keying result to recognize UEs that are present and report a list of the recognized UEs to an eNB. In addition, in order to avoid complexity of an operation of applying the hashing function, the UE may establish a discovery signal reception map indicating a resource from which an ON signal is detected and a resource from which an OFF signal is detected and report the discovery signal reception map to the eNB. The discovery signal reception map may be transmitted in the form of a bitmap indicating on/off in each unit time/subframe group.

Second Embodiment

Hereinafter, a method of determining subframes used to transmit one ID signal when a UE ID signal is divided and transmitted over a plurality of subframes as described above will be described.

In general, a UE that transmits an ID signal to another UE and a UE that detects an ID signal of another UE may be conned to an eNB and may transmit and receive signals. Thus, an overall signal transmission/reception operation of a UE can be smoothly performed only if a problem does not occur in terms of coexistence of a transmission/reception operation of a UE ID signal and a transmission/reception operation of a UE-eNB signal.

However, it is very difficult to simultaneously perform the UE ID signal transmission/reception operation and the UE-eNB signal transmission operation at the same time. In detail, from a viewpoint of a UE that transmits a UE ID signal, two signals may be transmitted at very different transmission powers, and thus, an output power range in which a transmission power amplifier can stably operate needs to be very wide in order to simultaneously transmit a UE ID signal for direction communication between UEs and a general UL signal at the same time, thereby increasing the cost. In addition, from a viewpoint of a UE that receives the UE ID signal, a signal transmitted to an eNB from the UE acts as high interference to the UE ID signal received by the UE, and thus, an expensive apparatus for removing interference is needed to remove the interference.

To prevent the difficulty and allow an operation between UEs at low cost, the UE ID signal transmission/reception operation and the UE-eNB signal transmission operation needs to be separated from a temporal point of view. That is, in a subframe in which the UE transmits or receives the UE ID signal, a signal is not transmitted to the eNB.

An operation of separating the UE ID signal and the UE-eNB signal from a temporal point of view may be appropriate for embodying a UE but may act as an obstacle to an HARQ operation of UE-eNB link. In detail, in a 3GPP LTE system, a point in time for retransmission of a PUSCH, which is transmitted to an eNB by a UE at a specific point in time, is predetermined when reception of the PUSCH fails. In this regard, when the UE needs to perform the UE ID signal transmission/reception operation at the predetermined point in time, it may be impossible to retransmit the corresponding PUSCH, and thus, additional time delay is caused for restoring reception error of the corresponding PUSCH.

To minimize influence on the UE-eNB HARQ operation, a second embodiment of the present invention proposes an operation of synchronizing transmission of the UE ID signal with an HARQ period of the UE-eNB link.

In more detail, in an LTE FDD system, HARQ with a frequency of 8 ms is performed in the UE-eNB link, which means a PUSCH that is transmitted in a subframe n from a UE is retransmitted in a subframe (n+8). In this situation, the UE ID signal may be transmitted and received at a frequency corresponding to 8 ms or a multiple of 8 ms. This is because the operation of transmitting and receiving the UE ID signal at a frequency corresponding to 8 ms or a multiple of 8 ms affects only one UE-eNB HARQ process, and the other HARQ processes can be used without being affected by commmunication between UEs. For example, in the operation of FIG. 9, each portion $P_n$ of the UE ID signal may be transmitted at an interval of 8 ms.

In an LTE TDD system, operations of the HARQ processes may be changed according to UL-DL configuration shown in Table 1 below.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Table 2 below summarizes a UE-eNB HARQ operation in each UL-DL configuration of Table 1 above.

TABLE 2

| UL-DL Config-uration | # of HARQ process | Period | UL SF | UL grant | UL | PHICH | re-UL | PHICH | re-UL | PHICH | re-UL | PHICH | re-UL | PHICH | re-UL | PHICH | re-UL | PHICH | re-UL |
|---|---|---|---|---|---|---|---|---|---|---|---|---|---|---|---|---|---|---|---|
| #0 | 7 | 70 ms | 2 | 6 | 2 | 6 | 3 | 0 | 4 | 0 | 7 | 1 | 8 | 5 | 9 | 5 | 2 | 6 | 3 |
|  |  |  | 3 | (6) | 3 | 0 | 4 | 0 | 7 | 1 | 8 | 5 | 9 | 5 | 2 | 6 | 3 | 0 | 4 |
|  |  |  | 4 | 0 | 4 | 0 | 7 | 1 | 8 | 5 | 9 | 5 | 2 | 6 | 3 | 0 | 4 | 0 | 7 |
|  |  |  | 7 | 1 | 7 | 1 | 8 | 5 | 9 | 5 | 2 | 6 | 3 | 0 | 4 | 0 | 7 | 1 | 8 |
|  |  |  | 8 | (1) | 8 | 5 | 9 | 5 | 2 | 6 | 3 | 0 | 4 | 0 | 7 | 1 | 8 | 5 | 9 |
|  |  |  | 9 | 5 | 9 | 5 | 2 | 6 | 3 | 0 | 4 | 0 | 7 | 1 | 8 | 5 | 9 | 5 | 2 |
| #6 | 6 | 60 ms | 2 | 5 | 2 | 6 | 3 | 9 | 4 | 0 | 7 | 1 | 8 | 5 | 2 |  |  |  |  |
|  |  |  | 3 | 6 | 3 | 9 | 4 | 0 | 7 | 1 | 8 | 5 | 2 | 6 | 3 |  |  |  |  |
|  |  |  | 4 | 9 | 4 | 0 | 7 | 1 | 8 | 5 | 2 | 6 | 3 | 9 | 4 |  |  |  |  |
|  |  |  | 7 | 0 | 7 | 1 | 8 | 5 | 2 | 6 | 3 | 9 | 4 | 0 | 7 |  |  |  |  |
|  |  |  | 8 | 1 | 8 | 5 | 2 | 6 | 3 | 9 | 4 | 0 | 7 | 1 | 8 |  |  |  |  |
| #1 | 4 | 10 ms | 2 | 6 | 2 | 6 | 2 | 6 |  |  |  |  |  |  |  |  |  |  |  |
|  |  |  | 3 | 9 | 3 | 9 | 3 | 9 |  |  |  |  |  |  |  |  |  |  |  |
|  |  |  | 7 | 1 | 7 | 1 | 7 | 1 |  |  |  |  |  |  |  |  |  |  |  |
|  |  |  | 8 | 4 | 8 | 4 | 8 | 4 |  |  |  |  |  |  |  |  |  |  |  |
| #2 | 2 | 10 ms | 2 | 8 | 2 | 8 | 2 | 8 |  |  |  |  |  |  |  |  |  |  |  |
|  |  |  | 7 | 3 | 7 | 3 | 7 | 3 |  |  |  |  |  |  |  |  |  |  |  |
| #3 | 3 | 10 ms | 2 | 8 | 2 | 8 | 2 | 8 |  |  |  |  |  |  |  |  |  |  |  |
|  |  |  | 3 | 9 | 3 | 9 | 3 | 9 |  |  |  |  |  |  |  |  |  |  |  |
|  |  |  | 4 | 0 | 4 | 0 | 4 | 0 |  |  |  |  |  |  |  |  |  |  |  |
| #4 | 2 | 10 ms | 2 | 8 | 2 | 8 | 2 | 8 |  |  |  |  |  |  |  |  |  |  |  |
|  |  |  | 3 | 9 | 3 | 9 | 3 | 9 |  |  |  |  |  |  |  |  |  |  |  |
| #5 | 1 | 10 ms | 2 | 8 | 2 | 8 | 2 | 8 |  |  |  |  |  |  |  |  |  |  |  |

Referring to Table 2 above, in the case of UL-DL configuration #0, 7 HARQ processes with a period of 70 ms are present. In this regard, when initial transmission is performed in a subframe #2, the HARQ processes with a period of 70 ms may be performed by repeating an operation of receiving a PHICH in subframe #6 of a next radio frame and retransmission based on the reception is performed in subframe #3 of a next radio frame in an order of {2, 3, 4, 7, 8, 9, 2, . . . ) as an index of a transmission subframe.

To satisfy the TDD HARQ, transmission subframes of the UE ID signal may have the same pattern. For convenience of description, the case of UL-DL configuration #0 will be exemplified. The UE ID signal may be transmitted/received in a pattern corresponding to a period of 70 ms by repeating an operation of transmitting a portion of the UE ID signal in subframe #2 and then transmitting another portion of the UE ID signal in subframe #3 of a next radio frame in an order of {2, 3, 4, 7, 8, 9, 2, . . . ) as an index of a transmission subframe.

In other words, as shown in Table 2 above, the UE ID signal may be transmitted and received while subframes indicated by UL or re-UL in rows of each UL-DL configuration are sequentially used (that is, only one subframe is used in a radio frame and a next indicated subframe is used in a next radio frame).

In the case of UL-DL configurations #1, #2, #3, #4, and #5 with an HARQ period of 10 ms, the UE ID signal is transmitted at an interval of 10 ms, and in the case of UL-DL configurations #0 and #6 with the other HARQ period, the UE ID signal is transmitted at an interval of (10+x) ms. Here, x is determined as a point in time corresponding to a first indicated UL subframe after 10 ms elapses from a point in time when the UE ID signal is previously transmitted. For example, when a previous UE ID signal transmission subframe is subframe #2, a first indicated UL subframe after 10 ms elapses is subframe #3 of a next radio frame, and thus, an interval between the two subframes is 11 ms.

When an LTE TDD system uses all periods of time of a specific HARQ process, an interval between UE ID signal transmissions may be approximately 10 ms. In order to increase this transmission interval to reduce UE ID transmission power, it may be possible to use only some subframes of the specific HARQ process. For example, in the case of UL-DL configurations #1, #2, #3, #4, and #5 with an HARQ period of 10 ms, the UE ID signal may be transmitted at an interval of a multiple of 10 ms. In addition, in the case of UL-DL configurations #0 and #6, an HARQ period of which is not 10 ms, the UE ID signal of the specific HARQ process may be transmitted in the form in which some subframes are skipped.

For example, in the case of UL-DL configuration #0, when a transmission subframe is given according to {2, 3, 4, 7, 8, 9}, in order to maintain a transmission interval of about 20 ms, indexes of the subframes may be selected and transmission subframes of the UE ID may be transmitted in an order of {2, 4, 8, 3, 7, 9, . . . } in every two frames in the form in which the UE ID signal is transmitted in subframe #2, is not transmitted in subframe #3 of a next radio frame as a next transmission point in time, and then is transmitted is subframe #4 of a next indicated radio frame.

Likewise, when the UE ID signal transmission/reception operation is performed based on the eNB-UE HARQ operation, the eNB may request to the UE to perform the UE ID signal transmission/reception operation using a certain HARQ process via a higher layer signal such as RRC. This request can be expressed simply by indicating a specific point in time of the UE ID signal transmission/reception operation. For example, the eNB may denote a specific radio frame index and subframe index, and the UE may perform the corresponding UE ID signal transmission/reception operation using a subframe belonging to an HARQ process of UE-eNB link, starting from the corresponding subframe of the corresponding radio frame. In addition, when the UE ID signal needs to be transmitted and received between UEs positioned in different cells, one side cell may notify an adjacent cell of a UE-eNB HARQ process corresponding to a subframe in which the UE ID signal transmission/reception operation is performed on an opposite side cell by the one side cell via backhaul link.

Third Embodiment

When an ID signal is formed/transmitted, all pieces of ID information may not be used as necessary. For example, when a specific user transmits an ID of the specific user to allow an adjacent user to discover the specific user, if another random user can recognize that the specific user is positioned adjacent to the random user, the specific user may not want this situation for protection of personal positional information. That is, the specific user may want to limit a user that can detect the specific user to only some users that the specific user knows. Hereinafter, a user that does not want an ID signal to contain whole information is referred to as a user type 1.

With regard to the user type 1, it may be helpful to transmit a portion of the ID signal. For example, when an ID signal having a dual structure of the short ID signal and the long ID signal described with reference to FIGS. 7 and 8 is transmitted, the user type 1 may operate to transmit only the short ID signal or the long ID signal. Alternatively, as described with reference to FIG. 9, when an ID signal is divided into a plurality of pieces and transmitted, the user type 1 may operate to transmit only some of the all pieces of the ID signal.

Alternatively, as illustrated in FIG. 6, when an ID signal is configured by applying a hashing function based on a user ID, the user type 1 may use only a portion of the user ID as input of the hashing function. As a method for this embodiment, the user type 1 may substitute a portion of the user ID as another value irrespective of an ID of the user type 1 and use the value as input of the hashing function. In detail, when the user ID is given by [10101010], if all last three bits needs to be configured to 1 during formation of the ID signal of the user type 1, the hashing function with a user ID of [10101111] may be applied to form the ID signal. In this case, since all users with a user ID of [10101xxx] inevitably transmit the same ID signal, a user cannot be completely identified based on the ID signal only.

On the other hand, when a user that transmits an ID signal wants to transmits information such as an advertisement message to unspecified users, the user may want other users to acquire complete user information based on the ID signal only. Hereinafter, a user that wants whole user information in the ID signal is referred to as a user type 2. The user type 2 is distinguished from the user type 1 in that the user type 2 uses a whole user ID in order to generate/transmit the aforementioned series of ID signals.

For this operation, each UE that wants direct communication between UEs may indicate a user type to which the UE belongs and an eNB may also operate to generate/transmit an ID signal in the form appropriate for each user type.

When the user type 1 transmits an ID signal and another user detects the ID signal, the user cannot recognize complete user information, and thus, an additional user discovery procedure is required. To this end, the user that detects the ID signal of the user type 1 may request an eNB to begin a final user checking procedure while reporting detection of this type of user to the eNB. In this case, the reported ID signal may include ID information (e.g., whole ID information of the user, partial user ID information derived from the detected ID signal, locations of time/frequency resources for transmission of the detected ID signal, etc.) of a user that the user that detects the signal wants to lastly discover. When the eNB knows that the ID of the user that the ID signal detection user wants to lastly detect is different from an ID of a user that actually transmits the corresponding ID, the eNB may not determine that a final user detection procedure needs to be initiated and may not begin the final user detection procedure, and may also notify the ID signal detection user of this information.

When the eNB determines that the final user detection procedure needs to be initiated, the eNB may transmit final detection procedure request information of the ID signal detection user to the user type 1 that transmits the ID signal. In this case, the user type 1 that transmits the ID signal may determine whether a corresponding user is allowed to detect the user type 1 based on the information of the user that the user type 1 wants to lastly detect and return whether the final detection procedure is initiated to the eNB. That is, even if there is a user that wants to be lastly detected, when a user that transmits an ID signal does not want the final detection procedure on a user that detects the ID signal, the user notifies an eNB of this information and does not initiate the final detection procedure. In other words, the final detection procedure is initiated only when the eNB checks that the user that transmits the ID signal wants a detection procedure on a user that requests the final detection procedure. Likewise, the eNB participates in whether the final detection procedure is initiated. Thus, when the user type 1 transmits an ID signal, the final user detection procedure may be initiated only if both opposite users want, thereby protecting positional information of the user type 1. As an example of the final user detection procedure, when a user that transmits an ID signal transmits the ID signal as only partial information, the ID signal may be transmitted as whole information, or information about an eNB will transmit and receive a specific type of signal to the user that transmits the ID signal and the user that receives the ID signal to perform the final detection procedure.

Figure 15:
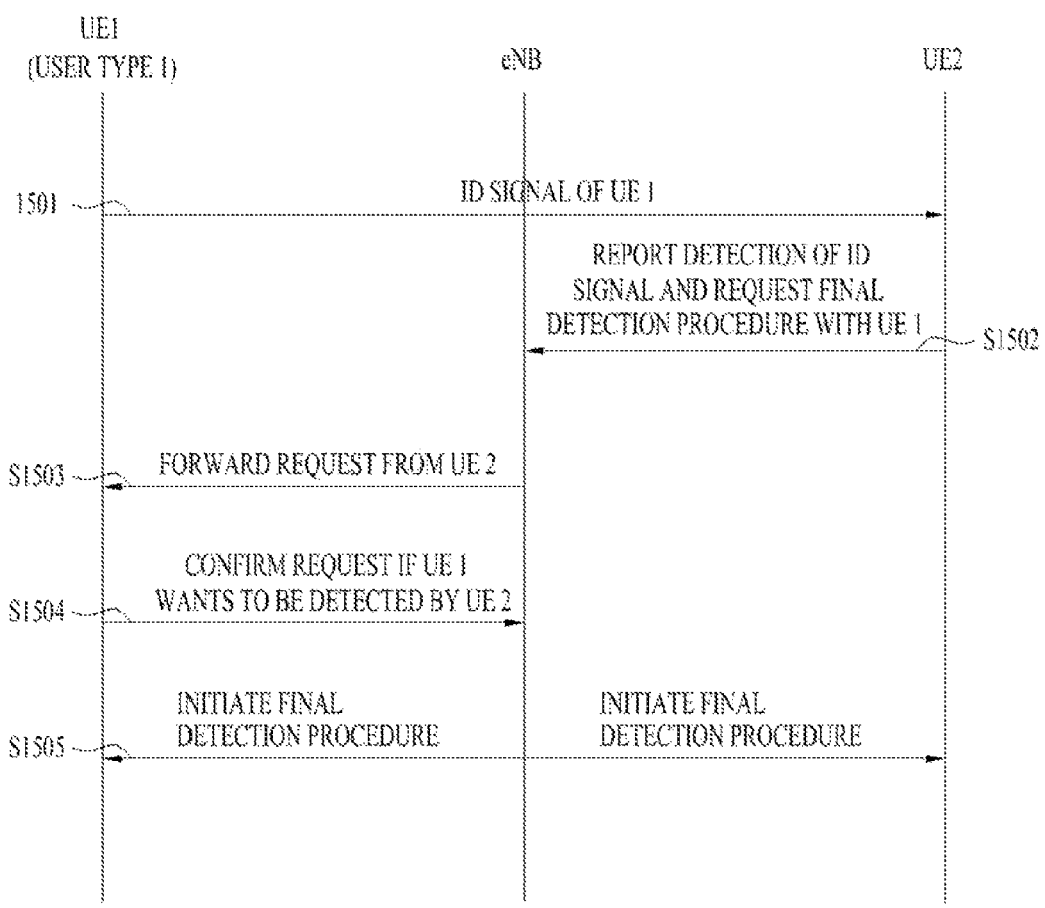
FIG. 15 is an example of a final user discovery procedure when a specific user detects an ID signal of a user type 1 according to a third embodiment of the present invention.

FIG. 15 is an example of a final user discovery procedure when a specific user detects an ID signal of the user type 1 according to a third embodiment of the present invention. In particular, FIG. 15 assumes that the UE 1 is the user type 1.

Referring to FIG. 15, in S1501, the UE 1 transmits an ID signal of the UE 1. Then the UE 2 that detects the ID signal of the UE 1 reports detection of the ID signal of the UE 1 and transmits a signal for requesting the final detection procedure on the UE 1 to an eNB in S1502.

In S1503, the eNB transmits the signal for requesting the final detection procedure, received from the UE 2, to the UE 1, and when the UE 1 wants detection of the UE 2, transmits an ACK message to the request to the eNB, in S1504.

Lastly, the eNB transmits messages for initiating the final detection procedure to the UE 1 and the UE 2, in S1505.

Fourth Embodiment

When a UE detects a signal of another UE, a predetermined level of synchronization between two UEs is required. However, in general, UEs that participates in direct communication perform communication with an eNB and maintains synchronization with the eNB for the communication. In detail, the eNB determines a timing advance (TA) value to be applied for UE signal transmission in consideration of propagation delay of each UE signal. In this regard, the TA value varies for each respective UE, and thus, timings of UL subframes viewed from UEs do not match in general.

Figure 16:
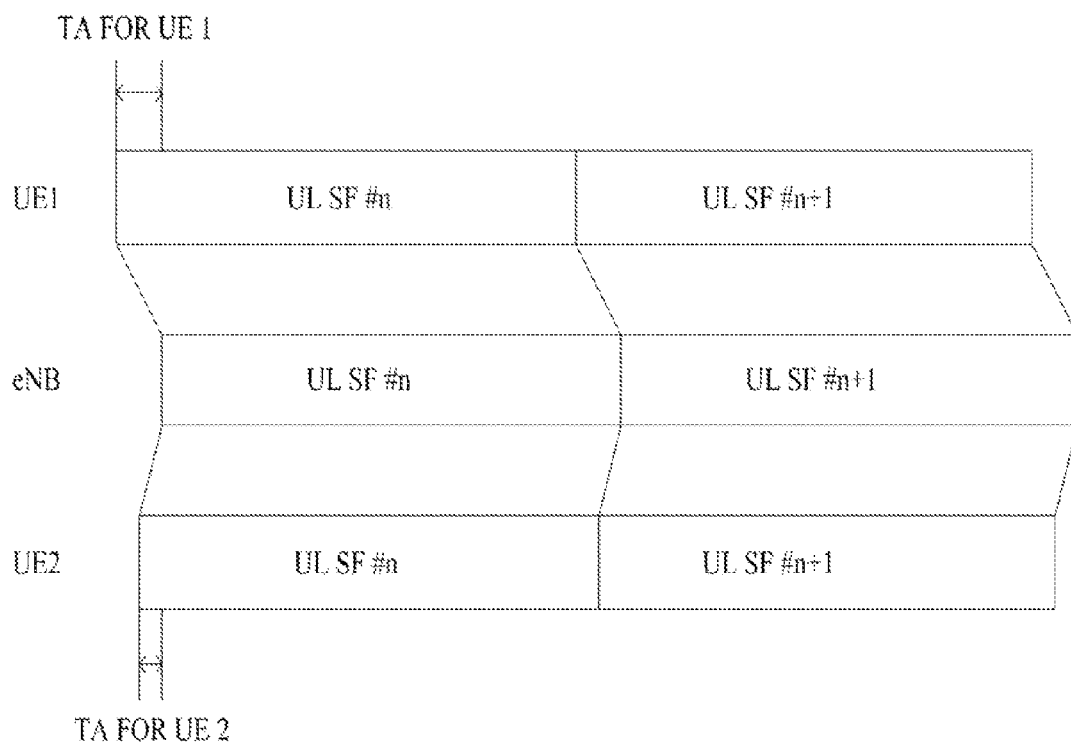
FIG. 16 is a diagram illustrating a timing difference between uplink subframes of UEs having different timing advance (TA) values.

FIG. 16 is a diagram illustrating a timing difference between UL subframes (UL SFs) of UEs having different TA values.

As seen from FIG. 16, when the UE 1 and the UE 2 have different TAs for the reason such as a distance difference from an eNB or errors of TA adjustment, and accordingly, boundaries of UL SFs assumed by the UE 1 and the UE 2 do not match each other. In this case, when the UE 1 transmits a signal to the UE 2, it may be difficult to smoothly detect signals due to mismatch between the boundaries of the UL SFs between the two UEs.

To address this problem, assuming that the UE 2 that receives a signal is not synchronized with the UE 1, the UE 2 can consider to attempt to detect the signal of the UE 1. However, the UE inevitably attempts to detect the signal of the UE 1 in an excessively wide range, thereby increasing battery consumption.

Accordingly, a fourth embodiment of the present invention proposes detection of a signal of a transmission UE assuming that a UE that receives a signal of another UE is synchronized with the transmission UE within a predetermined error, i.e., a specific timing window.

That is, when a specific subframe is started at a point in time t0 in timing of the UE, assuming that the signal of the transmission UE begins to be received at a point in time between $[t_0-e_1, t_0+e_2]$, the UE attempts to detect the signal of the transmission UE only when the corresponding period is used as a start point. Here, $e_1$ and $e_2$ are parameters for determination of a maximum range of mismatch between subframe boundaries of two UEs and is predetermined as a specific value or transmitted to a UE via a higher layer signal such as RRC (e.g., during a procedure of transmitting various parameters about direct communication between UEs). For example, an eNB that wants to detect a signal between UEs that are more distantly spaced apart may set a maximum range of mismatch between subframe boundaries to a great value, but on the other hand, an eNB that wants to detect a signal between UEs that are closed at a short interval may set the maximum range to a smaller value and transmit the value.

In addition, a UE may set a range in which detection of a signal of another UE is started based on battery remains and report the set value to an eNB. For example, the UE with low battery remains reduces the range to reduce energy consumed in another UE and the eNB that knows the reduced eNB determines only a UE, TA of which is set to be similar to the corresponding UE, as a target of communication between UEs.

Alternatively, the range may be set to be different according the capability/category of the UE and the UE may report a range that can be supported by the UE during initial access to the eNB.

Figure 17:
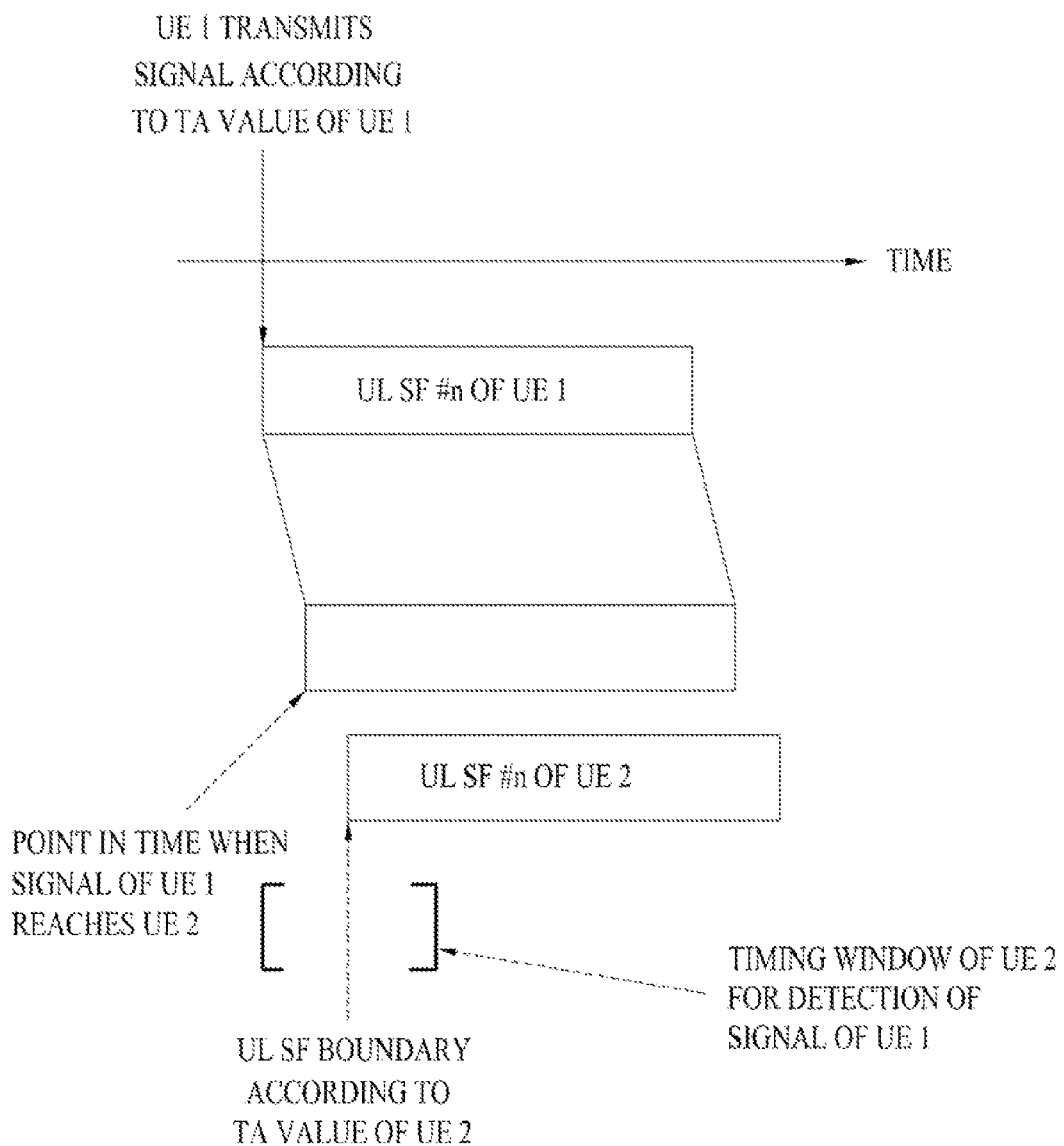
FIG. 17 is a diagram illustrating a procedure in which a UE 2 detects a signal of a UE 1 according to a fourth embodiment of the present invention.

FIG. 17 is a diagram illustrating a procedure in which the UE 2 detects a signal of the UE 1 according to the fourth embodiment of the present invention.

Referring to FIG. 17, assuming that a signal of the UE 1 is synchronized with the UE 2 within a timing window determined based on a TA value of the UE 2, the UE 2 detects a signal of the UE 1.

Thus far, the case in which the transmission UE transmits a signal from a start point of a specific subframe has been described, but the embodiments of the present invention are not limited to the case. That is, the transmission UE may operate to transmit the signal from an $M^{th}$ symbol of a specific subframe in order to address the problem in terms of mismatch between subframe boundaries. In this case, the reception UE may assume that a signal of the transmission UE begins to be received at a point in time between a timing window $\lfloor t_0+(M-1)*T_{symbol}-e_1, t_0+(M-1)*T_{symbol}+e_2 \rfloor$. Here, $T_{symbol}$ refers to time duration occupied by one transmission symbol.

When the aforementioned operation is applied, the eNB needs to be reported a TA value of each UE, to select only synchronized UEs within the aforementioned timing window based on the TA value of each UE, and to perform direct communication between UEs.

Figure 18:
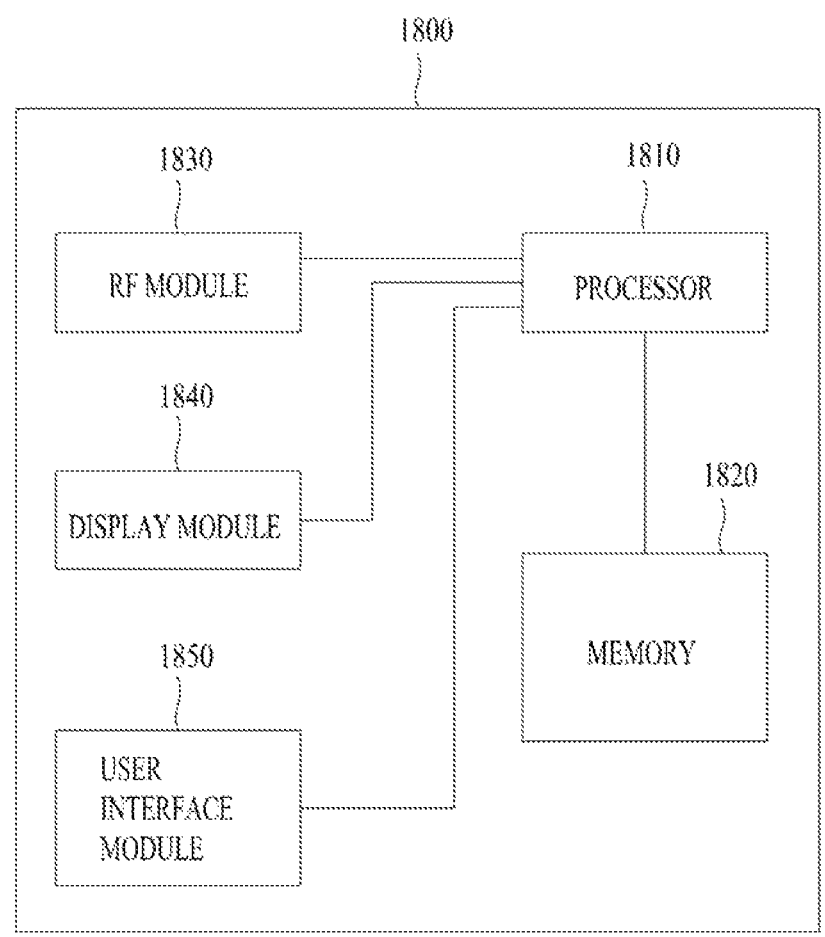
FIG. 18 is a block diagram of a structure of a communication apparatus according to the present invention.

FIG. 18 is a block diagram of a structure of a communication apparatus 1800 according to the present invention.

Referring to FIG. 18, the communication apparatus 1800 includes a processor 1810, a memory 1820, a radio frequency (RF) module 1830, a display module 1840, and a user interface module 1850.

The communication apparatus 1800 is illustrated for convenience of description and some modules can be omitted. In addition, the communication apparatus 1800 may further include necessary modules. In addition, some modules of the communication apparatus 1800 may be divided into more divided modules. The processor 1810 is configured to perform the operation according to the embodiment of the present invention described with reference to the drawings. In detail, a detailed operation of the processor 1810 can be understood with reference to FIGS. 1 to 17.

The memory 1820 is connected to the processor 1810 and stores an operating system, an application, a program code, data, etc. The RF module 1830 is connected to the processor 1810 to convert a baseband signal into a radio signal or to convert a radio signal into a baseband signal. To this end, the RF module 1830 performs analog conversion, amplification, filtering, and frequency UL conversion, or opposite procedures thereto. The display module 1840 is connected to the processor 1810 to display various pieces of information. The display module 1840 is not limited thereto but may use well known components such as a liquid crystal display (LCD), a light emitting diode (LED), and an organic light emitting diode (OLED). The user interface module 1850 may be connected to the processor 1810 and may include a combination of well known user interfaces such as a keypad, a touchscreen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The aforementioned method and apparatus for detecting a signal for direct communication between user equipments (UEs) in a wireless communication system have been described in terms of an example applied to a 3$^{rd}$ generation partnership project long term evolution (3GPP LTE) system, but can be applied to various wireless communication systems as wells as the 3GPP LTE system.

The invention claimed is:

1. A method of transmitting an identity (ID) signal by a first user equipment (UE) to a second UE for device-to-device (D2D) communication between UEs in a wireless communication system that includes a network, the method comprising:
   receiving, by the first UE from the network, configuration information on a first ID signal,
   wherein the configuration information comprises a value corresponding to a synchronization time window for receiving the first ID signal by the second UE, the synchronization time window being relative to a start time of a reception resource assigned to the second UE by the network; and
   transmitting, by the first UE to the second UE, the first ID signal based on the configuration information so that the first ID signal is received by the second UE within a reception time window having a length greater than the length of the synchronization window and encompassing the start time of the reception resource.

2. The method according to claim 1,
   wherein the first ID signal is an on-off keying sequence generated using a portion of information about the first UE.

3. The method according to claim 2, wherein the on-off keying sequence is generated using information about a point in time for transmission of a second ID signal and the portion of the information about the first UE.

4. The method according to claim 2, wherein the transmitting of the first ID signal comprises transmitting a signal at predetermined transmission power in a transmission resource corresponding to a value that is not 0 and transmitting a null signal in a transmission resource corresponding to a value 0 in the on-off keying sequence.

5. The method according to claim 2, wherein the portion of the information about the first UE is at least one of a unique number of the first UE, a second ID signal, and a type of a communication service to be performed by the first UE.

6. The method according to claim 2, further comprising:
   transmitting, to the second UE, a second ID signal containing a remaining portion of the information about the first UE,
   wherein the portion of the information about the first UE is a portion of a unique number of the first UE; and
   wherein the remaining portion of the information about the first UE is a remaining portion of the unique number.

7. A method of receiving an identity (ID) signal from a first user equipment (UE) by a second UE for device-to-device (D2D) communication between UEs in a wireless communication system that includes a network, the method comprising:
   receiving, by the second UE from the network, configuration information on an ID signal,
   wherein the configuration information comprises a value corresponding to a synchronization time window for receiving the ID signal, the synchronization time window being relative to a start time of a reception resource assigned to the second UE by the network; and
   receiving, by the second UE from the first UE, the ID signal based on the configuration information, the ID signal received within a reception time window having a length greater than the length of the synchronization window and encompassing the start time of the reception resource.

8. The method according to claim 7, the reception time window comprises a duration determined by adding the value to a specific reference.

9. The method according to claim 7, the reception time window comprises a duration determined by subtracting the value from a specific reference.

10. The method according to claim 7, the second UE does not receive the ID signal at a time other than within the reception time window.

11. The method according to claim 7, the second UE assumes that the ID signal is not transmitted at a time other than the reception time window.

12. The method according to claim 7, the ID signal corresponds to a discovery signal.

* * * * *